US012555552B2

(12) United States Patent
Chen et al.

(10) Patent No.: US 12,555,552 B2
(45) Date of Patent: Feb. 17, 2026

(54) DISPLAY DEVICE, GAMMA VOLTAGE DATA GROUP SWITCHING METHOD AND MODULE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Gong Chen, Beijing (CN); Jiaxiang Zhang, Beijing (CN); Zheng Bao, Beijing (CN); Lian Xiang, Beijing (CN); Bo Peng, Beijing (CN); Yuan Fang, Beijing (CN); Yakun Kong, Beijing (CN); Jingwen Li, Beijing (CN); Ziqian Li, Beijing (CN); Mingqiang Wang, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 67 days.

(21) Appl. No.: 18/557,867

(22) PCT Filed: Sep. 23, 2022

(86) PCT No.: PCT/CN2022/120886

§ 371 (c)(1),
(2) Date: Oct. 27, 2023

(87) PCT Pub. No.: WO2024/060206

PCT Pub. Date: Mar. 28, 2024

(65) Prior Publication Data

US 2025/0078781 A1 Mar. 6, 2025

(51) Int. Cl.
*G09G 5/10* (2006.01)
*G09G 3/20* (2006.01)

(52) U.S. Cl.
CPC ............ *G09G 5/10* (2013.01); *G09G 3/2096* (2013.01); *G09G 2310/08* (2013.01); (Continued)

(58) Field of Classification Search
CPC ........................................................ G09G 5/10
See application file for complete search history.

(56) References Cited

U.S. PATENT DOCUMENTS

| | | | |
|---|---|---|---|
| 2016/0246431 | A1 | 8/2016 | Ma et al. |
| 2018/0151155 | A1 | 5/2018 | Chen et al. |

FOREIGN PATENT DOCUMENTS

| | | | |
|---|---|---|---|
| CN | 104063105 | A | 9/2014 |
| CN | 105788551 | A | 7/2016 |

(Continued)

*Primary Examiner* — Gustavo Polo
(74) *Attorney, Agent, or Firm* — BROOKS KUSHMAN P.C.

(57) ABSTRACT

A display device, a gamma voltage data group switching method and module. The display device includes a display-driver integrated circuit and a first storage unit. The display-driver integrated circuit includes a second storage unit, and the display device includes a gamma voltage data group switching module. The gamma voltage data group switching module is configured to pre-store, in the first storage unit, multiple groups of gamma voltage data groups respectively applied to various application scenarios; when switching of an application scenario of the display device, load a gamma voltage data group corresponding to the current application scenario and stored in the first storage unit into the second storage unit.

12 Claims, 4 Drawing Sheets

(52) U.S. Cl.
CPC ............... *G09G 2320/0276* (2013.01); *G09G 2320/0673* (2013.01); *G09G 2340/0435* (2013.01)

(56) References Cited

FOREIGN PATENT DOCUMENTS

| | | | |
|---|---|---|---|
| CN | 114120877 | A | 3/2022 |
| CN | 114968143 | A | 8/2022 |
| CN | 114974069 | A | 8/2022 |
| JP | 2008145496 | A | 6/2008 |

DISPLAY DEVICE, GAMMA VOLTAGE DATA GROUP SWITCHING METHOD AND MODULE

CROSS-REFERENCE TO RELATED APPLICATION

This application is the U.S. national phase of PCT Application No. PCT/CN2022/120886 filed on Sep. 23, 2022, which is incorporated herein by reference in its entirety.

TECHNICAL FIELD

The present disclosure relates to the field of display technologies, in particular to a display device, a gamma voltage data group switching method and module.

BACKGROUND

Display devices undergo automated gamma debugging and programming during production. Generally, an automatic gamma correction system matches and debugs voltages of red, green and blue pixels in real time based on mapping relationship between driving voltages and brightness of a display product, and corrects optical parameters of the display product, thereby obtaining data-voltage data that meets requirements.

SUMMARY

In a first aspect, one embodiment of the present disclosure provides a display device, including a display-driver integrated circuit and a first storage unit; wherein the display-driver integrated circuit includes a second storage unit, and the display device includes a gamma voltage data group switching module;

the gamma voltage data group switching module is configured to pre-store, in the first storage unit, multiple groups of gamma voltage data groups respectively applied to various application scenarios; when switching of an application scenario of the display device, load a gamma voltage data group corresponding to the current application scenario and stored in the first storage unit into the second storage unit.

Optionally, the display device further includes a display panel;

the gamma voltage data group switching module is configured to, when switching of the application scenario of the display device, after loading the gamma voltage data group corresponding to the current application scenario and stored in the first storage unit into the second storage unit, control the display-driver integrated circuit to call the gamma voltage data group corresponding to the current application scenario from the second storage unit and control the display panel to display according to the called gamma voltage data group.

Optionally, the gamma voltage data group switching module is configured to, when switching of the application scenario of the display device, in a first display cycle, load the gamma voltage data group corresponding to the current application scenario and stored in the first storage unit into the second storage unit; and in a second display cycle, control the display-driver integrated circuit to call the gamma voltage data group corresponding to the current application scenario from the second storage unit;

the gamma voltage data group switching module is further configured to control the display-driver integrated circuit to control the display panel for performing black frame insertion displaying in the first display cycle and the second display cycle; or, control the display-driver integrated circuit to control the display panel for performing black frame insertion displaying in the first display cycle.

Optionally, a storage capacity of the first storage unit is greater than a storage capacity of the second storage unit.

Optionally, the switching of the application scenario includes: changing a base frequency of the display device, and/or, changing a display refresh frequency of the display device.

Optionally, the switching of the application scenario includes: switching between an IRC on of the display device and an IRC off of the display device.

Optionally, the switching of the application scenario includes: switching between a fingerprint recognition mode of the display device and a non-fingerprint recognition mode of the display device.

In a second aspect, one embodiment of the present disclosure provides a gamma voltage data group switching method applied to a display device which includes a first storage unit and a display-driver integrated circuit including a second storage unit. The gamma voltage data group switching method includes:

pre-storing, in the first storage unit, multiple groups of gamma voltage data groups respectively applied to various application scenarios;

after switching of an application scenario of the display device, loading a gamma voltage data group corresponding to the current application scenario and stored in the first storage unit into the second storage unit.

Optionally, the display device further includes a display panel; after the step of after switching of the application scenario of the display device, loading the gamma voltage data group corresponding to the current application scenario and stored in the first storage unit into the second storage unit, the gamma voltage data group switching method further includes:

calling, by the display-driver integrated circuit, the gamma voltage data group corresponding to the current application scenario from the second storage unit and controlling the display panel to display according to the called gamma voltage data group.

Optionally, after switching of the application scenario, in a first display cycle, the gamma voltage data group corresponding to the current application scenario and stored in the first storage unit is loaded into the second storage unit; and in a second display cycle, the display-driver integrated circuit calls the gamma voltage data group corresponding to the current application scenario from the second storage unit;

the gamma voltage data group switching method further includes:

controlling, by the display-driver integrated circuit, the display panel for performing black frame insertion displaying in the first display cycle and the second display cycle; or, controlling, by the display-driver integrated circuit, the display panel for performing black frame insertion displaying in the first display cycle.

Optionally, the first display cycle is a first frame time, and the second display cycle is a second frame time;

the gamma voltage data group switching method includes:

in case that there is a pulse in an instruction indication signal in a frame time before the first frame time, wherein the pulse is corresponding to an instruction for triggering loading of a gamma voltage data group corresponding to a switched application scenario to the second storage unit, in the first frame time, loading the gamma voltage data group corresponding to the switched application scenario and stored in the first storage unit into the second storage unit;

in case that there is a pulse in an instruction indication signal in the first frame time, wherein the pulse is corresponding to an instruction of calling, by the display-driver integrated circuit, the gamma voltage data group corresponding to the switched application scenario from the second storage unit, in the second frame time, calling, by the display-driver integrated circuit, the gamma voltage data group corresponding to the switched application scenario from the second storage unit.

Optionally, a storage capacity of the first storage unit is greater than a storage capacity of the second storage unit.

Optionally, the switching of the application scenario includes: changing a base frequency of the display device, and/or, changing a display refresh frequency of the display device.

Optionally, the switching of the application scenario includes: switching between an IRC on of the display device and an IRC off of the display device.

Optionally, the switching of the application scenario includes: switching between a fingerprint recognition mode of the display device and a non-fingerprint recognition mode of the display device.

In a third aspect, one embodiment of the present disclosure provides a gamma voltage data group switching module applied to a display device which includes a first storage unit and a display-driver integrated circuit including a second storage unit. The gamma voltage data group switching module includes a storage control circuit, an application scenario detection circuit and a loading control circuit;

wherein the storage control circuit is configured to control storing multiple groups of gamma voltage data groups respectively applied to various application scenarios in the first storage unit;

the application scenario detection circuit is configured to detect whether an application scenario of the display device is switched, and provides a first-control signal to the loading control circuit when the application scenario is switched;

the loading control circuit is configured to, after receiving the first-control signal, load a gamma voltage data group corresponding to the current application scenario and stored in the first storage unit into the second storage unit.

Optionally, the application scenario detection circuit is specifically configured to detect whether a base frequency of the display device, and/or, a display refresh frequency of the display device is changed, and when detecting a change in the base frequency of the display device and/or the display refresh frequency of the display device, provide a first first-control signal to the loading control circuit;

the loading control circuit is configured to, after receiving the first first-control signal, load a gamma voltage data group corresponding to a current base frequency and a current display refresh frequency and stored in the first storage unit, into the second storage unit.

Optionally, the application scenario detection circuit is specifically configured to detect whether an IRC of the display device is switched between an on state and an off state, and when detecting that the IRC of the display device is switched between the on state and the off state, provide a second first-control signal to the loading control circuit;

the loading control circuit is configured to, after receiving the second first-control signal, load a gamma voltage data group corresponding to a current state of the IRC and stored in the first storage unit into the second storage unit.

Optionally, the application scenario detection circuit is specifically configured to detect whether the display device is switched between a fingerprint recognition mode and a non-fingerprint recognition mode, and when detecting that the display device is switched between the fingerprint recognition mode and the non-fingerprint recognition mode, provide a third first-control signal to the loading control circuit;

the loading control circuit is configured to, after receiving the third first-control signal, load a gamma voltage data group corresponding to a current fingerprint identification mode or non-fingerprint identification mode of the display device and stored in the first storage unit into the second storage unit.

DETAILED DESCRIPTION

Figure 1:
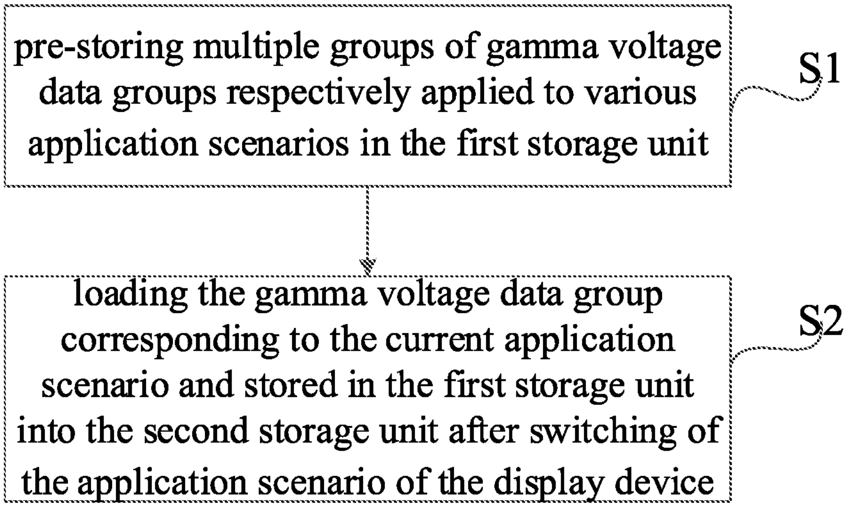
FIG. 1 is a flowchart of a gamma voltage data group switching method according to at least one embodiment of the present disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Transistors adopted in all embodiments of the present disclosure may be thin film transistors or field effect transistors or other devices with the same characteristics. In the embodiments of the present disclosure, to distinguish two electrodes of a transistor except for a gate electrode, one electrode is referred as a first electrode, and the other electrode is referred as a second electrode.

In actual operation, when the transistor is a thin film transistor or a field effect transistor, the first electrode may be a drain, and the second electrode may be a source; or, the first electrode may be a source, the second electrode may be a drain.

A display device according to one embodiment of the present disclosure includes a display-driver integrated circuit and a first storage unit. The display-driver integrated circuit includes a second storage unit. The display device includes a gamma voltage data group switching module.

The gamma voltage data group switching module is used to pre-store, in the first storage unit, multiple groups of gamma voltage data groups respectively applied to various application scenarios. After an application scenario of the display device is switched, the gamma voltage data group corresponding to a current application scenario and stored in the first storage unit, is loaded into the second storage unit.

In the embodiments of the present disclosure, after switching the application scenario of the display device to the current application scenario, the gamma voltage data group corresponding to the current application scenario is determined, and the gamma voltage data group is selected from the multiple groups of gamma voltage data groups stored in the first storage unit. The multiple groups of the gamma voltage data groups are corresponding to the various application scenarios of the display device in a one-to-one manner.

In the display device of the embodiments of the present disclosure, the gamma voltage data group switching module pre-stores the gamma voltage data groups applied to various application scenarios in the first storage unit; and after switching the application scenario of the display device, the gamma voltage data group switching module controls loading of the gamma voltage data group corresponding to the current application scenario and stored in the first storage unit, into the second storage unit, thereby realizing unlimited writing and reworking of the gamma voltage data groups and then improving the yield rate of production lines. Further, in the embodiments of the present disclosure, more groups of gamma voltage data groups can be stored, which can meet requirements for gamma voltage data groups in more application scenarios and enable smooth switching of gamma voltage data groups.

In at least one embodiment of the present disclosure, the first storage unit may be a flash memory, and the second storage unit may be a random access memory (RAM). The second storage unit may be included in a driver integrated circuit (DIC). The DIC may be a display-driver integrated circuit.

In related art, as display panels adopts new technologies such as multi-frequency switching, oscillator (OSC) frequency modulation, finger prints control (FPS) and IR drop compensation (IRC), the required number of groups of gamma voltage data groups and switching changes are also increasing, but the driver integrated circuit (DIC) has a limited internal storage space of, a limited number of programming times, cannot be erased, rewritten and cannot freely switch gamma voltage data groups.

The IR drop compensation is compensation for reduction in loading voltage, which can ensure that brightness of an organic light-emitting diode (OLED) display screen remains constant when displaying pictures of any occupied pattern ratio (OPR). In common scenarios, a terminal needs to use the gamma voltage data group corresponding to an IRC on state, so that brightness of any OPR picture remains unchanged in case of a non-black picture. When the terminal needs to use a high dynamic range (HDR) mode, IRC OFF is required; if the gamma voltage data group corresponding to the IRC on state is used at this time, a brightness of a display panel changes dramatically due to shutdown of an IRC IP (functional unit), resulting in undesirable flickering. Then, at this point, it is necessary to call the gamma voltage data group corresponding to the IRC off state to maintain a central brightness constant. Therefore, it is necessary to provide the gamma voltage data group corresponding to the IRC on state and the gamma voltage data group corresponding to the IRC off state.

In related art, organic light emitting diode (OLED) display panels undergo automated gamma debugging and programming through software during production. Generally, an automatic gamma correction system matches and debugs voltages of red, green and blue pixels in real time based on mapping relationship between driving voltages and brightness of the OLED display product, and corrects optical parameters of the display product, thereby obtaining data voltage that meets requirements. Data-voltage data is written in the driver integrated circuit (DIC) random access memory (RAM) in form of gamma value, and then programmed in the DIC read-only memory (ROM) through one time programmable. Finally, the DIC obtains data voltages corresponding to various gray scales through gamma values in the ROM. Due to factors such as limited integrated circuit (IC) size, manufacturing process and cost, the number of gamma voltage data groups that DIC can store is limited, generally, only 8 groups of gamma voltage data groups can be stored. Further, values of a gamma register cannot be erased and rewritten, and cannot be switched with the application scenarios, which greatly limits application scenarios of a client terminal.

In related art, due to factors such as limited integrated circuit (IC) size, manufacturing process and cost, the number of gamma voltage data groups that DIC can store is limited and cannot be erased and rewritten. In view of this, in at least one embodiment of the present disclosure, gamma voltage data groups applied in different application scenarios are programmed into Flash, and then rewritable and reprogramming capabilities of the Flash non-volatile large memory are utilized. When gamma abnormality is encountered and gamma reworking is required for a product, since there is no DIC OTP limit, after original gamma values (which may be a gamma voltage data group) in the Flash are erased, multiple groups of gamma voltage data groups are programmed into the Flash, and the gamma voltage data groups can be switched arbitrarily at any time to match different application scenarios of the display panel.

In at least one embodiment of the present disclosure, the display device further includes a display panel.

The gamma voltage data group switching module is configured to, when switching the application scenario of the display device, after loading the gamma voltage data group corresponding to the current application scenario from the first storage unit into the second storage unit, control the display-driver integrated circuit to call the gamma voltage data group corresponding to the current application scenario from the second storage unit and control the display panel to display according to the called gamma voltage data group.

In specific implementation, when the application scenario is switched, after the gamma voltage data group corresponding to the current application scenario is loaded from the first storage unit into the second storage unit, the gamma voltage data group switching module controls the display-driver integrated circuit to call the gamma voltage data group corresponding to the current application scenario from the second storage unit, and controls the display panel to display according to the called gamma voltage data group.

In at least one embodiment of the present disclosure, the gamma voltage data group switching module is configured to, when switching the application scenario, in a first display cycle, load the gamma voltage data group corresponding to the current application scenario and stored in the first storage unit into the second storage unit; and in a second display cycle, control the display-driver integrated circuit to call the gamma voltage data group corresponding to the current application scenario from the second storage unit.

The gamma voltage data group switching module is further configured to control the display-driver integrated circuit to control the display panel for performing black frame insertion displaying in the first display cycle and the second display cycle; or, control the display-driver integrated circuit to control the display panel for performing black frame insertion displaying in the first display cycle.

In specific implementation, after switching the application scenario, in the first display cycle, the gamma voltage data group switching module loads the gamma voltage data group corresponding to the current application scenario into the second storage unit; in the second display cycle, the gamma voltage data group switching module controls the display-driver integrated circuit to call the gamma voltage data group corresponding to the current application scenario from the second storage unit. In the first display cycle and the second display cycle, the gamma voltage data group switching module controls the display-driver integrated circuit to control the display panel for performing black frame insertion displaying, i.e., controlling the display panel to display a black image; or, in the first display cycle, the gamma voltage data group switching module controls the display-driver integrated circuit to control the display panel for performing black frame insertion displaying, so that no flicker phenomenon occurs during switching of the gamma voltage data groups.

Optionally, the first display cycle may be a first frame time, and the second display cycle may be a second frame time.

The gamma voltage data group switching method includes:

in case that there is a pulse in an instruction indication signal in a frame time before the first frame time, where the pulse is corresponding to an instruction for triggering loading of the gamma voltage data group corresponding to a switched application scenario to the second storage unit, in the first frame time, loading the gamma voltage data group corresponding to the switched application scenario stored in the first storage unit into the second storage unit;

in case that there is a pulse in an instruction indication signal in the first frame time, where the pulse is corresponding to an instruction for controlling the display-driver integrated circuit to call the gamma voltage data group corresponding to the switched application scenario from the second storage unit, in the second frame time, calling, by the display-driver integrated circuit, the gamma voltage data group corresponding to the switched application scenario from the second storage unit.

In at least one embodiment of the present disclosure, a storage capacity of the first storage unit is greater than a storage capacity of the second storage unit.

In specific implementation, the first storage unit may be a flash, and the second storage unit may be RAM. The storage capacity of the flash may be, for example, 32 M. In general, a space occupied by the gamma voltage data group may be about 2K, then the flash can store 16000 groups of the gamma voltage data groups, which are not limited to this.

In related art, data storage structure of the flash is mainly divided into Page, Sector, Block, Device (or drive block), etc. Page is a smallest programmable unit, with a size of 256 bytes. 16 Pages form one Sector, and a size of one Sector is 4 Kbyte. 16 Sectors form a Block. 64 Blocks form a Device. Details are shown in Table 1.

TABLE 1

| Flash | Device | Block | Sector | Page |
|---|---|---|---|---|
| 32M Byte | 4M Byte | 64K Byte | 4K Byte | 256 Byte |

In related art, when a capacity of a gamma memory in the DIC (the gamma memory may be RAM in the DIC) is about 16K bytes (as shown in Table 2), a storage space occupied by one group of gamma voltage data groups is about 2K byte (as shown in Table 3).

TABLE 2

| Capacity of internal gamma memory in DIC | | | |
|---|---|---|---|
| sector | address range | | capacity |
| 3 | 003000 | 003FFF | 4K Byte |
| 2 | 002000 | 002FFF | 4K Byte |
| 1 | 001000 | 001FFF | 4K Byte |
| 0 | 000000 | 000FFF | 4K Byte |

TABLE 3

| | gamma register | gamma value | | | | | |
|---|---|---|---|---|---|---|---|
| one gamma voltage data group | BF | 00 | — | — | — | — | — |
| | B0 | XX | XX | ...... | ...... | XX | XX |
| | B1 | XX | XX | ...... | ...... | XX | XX |
| | B2 | XX | XX | ...... | ...... | XX | XX |
| | B3 | XX | XX | ...... | ...... | XX | XX |
| | B4 | XX | XX | ...... | ...... | XX | XX |
| | B5 | XX | XX | ...... | ...... | XX | XX |
| | B6 | XX | XX | ...... | ...... | XX | XX |
| | B7 | XX | XX | ...... | ...... | XX | XX |
| | B8 | XX | XX | ...... | ...... | XX | XX |
| | BF | 01 | — | — | — | — | — |
| | B0 | XX | XX | ...... | ...... | XX | XX |
| | B1 | XX | XX | ...... | ...... | XX | XX |
| | B2 | XX | XX | ...... | ...... | XX | XX |
| | B3 | XX | XX | ...... | ...... | XX | XX |

TABLE 3-continued

| gamma register | gamma value | | | | | |
|---|---|---|---|---|---|---|
| B4 | XX | XX | ...... | ...... | XX | XX |
| B5 | XX | XX | ...... | ...... | XX | XX |
| B6 | XX | XX | ...... | ...... | XX | XX |
| B7 | XX | XX | ...... | ...... | XX | XX |
| B8 | XX | XX | ...... | ...... | XX | XX |
| ...... | ...... | ...... | ...... | ...... | ...... | ...... |
| ...... | ...... | ...... | ...... | ...... | ...... | ...... |
| ...... | ...... | ...... | ...... | ...... | ...... | ...... |
| BF | 0B | — | — | — | — | — |
| B0 | XX | XX | ...... | ...... | XX | XX |
| B1 | XX | XX | ...... | ...... | XX | XX |
| B2 | XX | XX | ...... | ...... | XX | XX |
| B3 | XX | XX | ...... | ...... | XX | XX |
| B4 | XX | XX | ...... | ...... | XX | XX |
| B5 | XX | XX | ...... | ...... | XX | XX |
| B6 | XX | XX | ...... | ...... | XX | XX |
| B7 | XX | XX | ...... | ...... | XX | XX |
| B8 | XX | XX | ...... | ...... | XX | XX |

As shown in the table 3, 12 groups of gamma registers are used to store one gamma voltage data group. In the table 3, a first group of gamma registers to a twelfth group of gamma registers are respectively labeled BF00-BF0B. Each gamma register group includes 9 gamma registers. Each gamma register group includes a first gamma register B0, a second gamma register B2, a third gamma register B3, a fourth gamma register B4, a fifth gamma register B5, a sixth gamma register B6, a seventh gamma register B7, and an eighth gamma register B8.

Each gamma register group stores red data voltages corresponding to 24 binding points, green data voltages corresponding to 24 binding points, and blue data voltages corresponding to 24 binding points. The 24 binding points may be binding point grayscale selected from 256 grayscales. Brightness corresponding to grayscale 255 corresponding to different gamma register groups is different.

In the table 3, XX represents data voltage.

When the capacity of the gamma memory (which may be RAM) in the used DIC is about 16K bytes, a storage space occupied by one group of gamma voltage data groups is about 2K bytes, so the DIC can store up to 8 groups of gamma voltage data groups. The number of times of programming in the IC is determined by the number of groups in a single programming. For example, if 5 groups of gamma voltage data groups are programmed at one time, then only one OTP can be performed; if 4 groups of gamma voltage data groups are programmed at one time, then two OTP can be performed; if 2 groups of gamma voltage data groups are programmed at one time, then four OTP can be performed.

When the required number of gamma voltage data groups is up to 10, as shown in Table 4, 120 Hz base frequency is a normal mode refreshed with a base frequency of 120 Hz; 60 Hz base frequency is a power saving mode refreshed with a base frequency of 60 Hz; FPS mode is a mode when entering fingerprint recognition; IRC is IR drop compensation. One terminal uses IRC OFF gamma voltage data groups in high dynamic range (HDR) mode that requires enhanced brightness; and uses IRC on gamma voltage data groups in normal scenarios. Only relying on the only 16K byte capacity inside the DIC, it is difficult to meet the required 20K byte gamma voltage data volume, and it is difficult to realize random switching of gamma voltage data groups. Therefore, in at least one embodiment of the present disclosure, the gamma voltage data groups are stored in the flash; after switching the application scenario, the gamma voltage data group stored in the flash and applied to the current application scenario, is loaded into the RAM inside the DIC.

TABLE 4

| Gamma setting | | | Description | Capacity |
|---|---|---|---|---|
| Number of Gamma voltage data groups | 120 Hz base frequency | 1 | 120 Hz with IRC on | 2K bytes |
| | | 2 | 120 Hz with IRC OFF | 2K bytes |
| | | 3 | 60 Hz with IRC on | 2K bytes |
| | | 4 | 60 Hz with IRC OFF | 2K bytes |
| | 60 Hz base frequency | 5 | 60 Hz with IRC on | 2K bytes |
| | | 6 | 60 Hz with IRC OFF | 2K bytes |
| | FPS mode | 7 | 120 Hz/120 Hz b with IRC on | 2K bytes |
| | | 8 | 120 Hz/120 Hz b with IRC OFF | 2K bytes |
| | | 9 | 60 Hz/60 Hz b with IRC on | 2K bytes |
| | | 10 | 60 Hz/60 Hz b with IRC OFF | 2K bytes |

In the table 4, a mode labeled with 1 is corresponding to non-FPS mode, in which a base frequency is 120 Hz, a display refresh frequency is 120 Hz, and an IRC on state is enabled.

A mode labeled with 2 is corresponding to non-FPS mode, in which a base frequency is 120 Hz, a display refresh frequency is 120 Hz, and an IRC off state is enabled.

A mode labeled with 3 is corresponding to the non-FPS mode in which a base frequency is 120 Hz, a display refresh frequency is 60 Hz, and an IRC on state is enabled.

A mode labeled with 4 is corresponding to the non-FPS mode, in which a base frequency is 120 Hz, a display refresh frequency is 60 Hz, and an IRC off state is enabled.

A mode labeled with 5 is corresponding to the non-FPS mode in which a base frequency is 60 Hz, a display refresh frequency is 60 Hz, and an IRC on state is enabled.

A mode labeled with 6 is corresponding to the non-FPS mode in which a base frequency is 60 Hz, a display refresh frequency is 60 Hz, and an IRC off state is enabled.

A mode labeled with 7 is corresponding to FPS mode in which a base frequency is 120 Hz, a display refresh frequency is 120 Hz, and an IRC on state is enabled.

A mode labeled with 8 is corresponding to FPS mode in which a base frequency is 120 Hz, a display refresh frequency is 120 Hz, and an IRC off state is enabled.

A mode labeled with 9 is corresponding to FPS mode in which a base frequency is 60 Hz, a display refresh frequency is 60 Hz and an IRC on state is enabled.

A mode labeled with 10 is corresponding to FPS mode in which a base frequency is 60 Hz, a display refresh frequency is 60 Hz, and an IRC off state is enabled.

In at least one embodiment of the present disclosure, the application scenario of the display device is not limited to the above 10 application scenario. For example, an existing high-end cell phone has a variety of frequency switching, even a screen of the high-end cell phone can use six or more kinds of frequencies, such as 144 Hz, 120 Hz, 90 Hz, 60 Hz, 30 Hz, 10 Hz, and other frequencies. Since there are slight differences in data voltage charging time at different frequencies, if the same gamma voltage data group is forcibly used, brightness of the same grayscale at different frequencies will vary greatly. Application scenario switching of the display device includes switching of base frequencies, switching of display refresh frequencies, switching between IRC on state and IRC off state, switching between a fingerprint recognition mode of the display device and a non-fingerprint recognition mode of the display device, and thus there are many application scenarios for displaying status, and the number of groups of corresponding gamma voltage data groups will be relatively large. For example, when the display device needs to switch display refresh frequencies, for example, switching from 120 Hz to 10 Hz, the display device first executes a switching frequency instruction to switch the display refresh frequency to 10 Hz, and loads the gamma voltage data group corresponding to 10 Hz into the RAM of the display-driver integrated circuit; then the display-driver integrated circuit selects switching to the gamma voltage data group corresponding to 10 Hz.

In at least one embodiment of the present disclosure, a storage capacity of the flash can be 32 M, and the storage structure of the flash can be as shown in Table 5. According to a space occupied by one group of gamma voltage data group is about 2K, it is calculated that the flash can hold 16,000 groups of gamma voltage data groups, which far exceeds the required 10 groups of gamma voltage data groups. When data needs to be stored in the flash, a writing location and a size of written data need to be defined. As shown in Table 6 and Table 7, 10 groups of gamma voltage data groups may be stored in a location of Device0/Block 5/Sector 85-90 of the flash. The gamma voltage data group corresponding to the IRC on mode is stored in a location of Device0/Block 5/Sector 88-90 of the flash. The gamma voltage data group corresponding to the IRC OFF mode is stored in a location of Device0/Block 5/Sector 85-87 of the flash.

TABLE 5

Flash storage structure

| Device | Block | sector | address range | |
|---|---|---|---|---|
| 7 | 63 | 1023 | 3FF000 | 3FFFFF |
| | | . . . | . . . | . . . |
| | | 1008 | 3F0000 | 3FOFFF |
| | 62 | 1007 | 3EF000 | 3EFFFF |
| | | . . . | . . . | . . . |
| | | 992 | 3E0000 | 3E0FFF |
| | . . . | . . . | . . . | . . . |
| | | . . . | . . . | . . . |
| | | . . . | . . . | . . . |
| | 1 | 31 | 01F000 | 01FFFF |
| | | . . . | . . . | . . . |
| | | 16 | 010000 | 010FFF |
| | 0 | 15 | 00F000 | 00FFFF |
| | | . . . | . . . | . . . |
| | | 0 | 000000 | 000FFF |
| . . . | . . . | . . . | . . . | . . . |
| 0 | 63 | 1023 | 3FF000 | 3FFFFF |
| | | . . . | . . . | . . . |
| | | 1008 | 3F0000 | 3FOFFF |
| | 62 | 1007 | 3EF000 | 3EFFFF |
| | | . . . | . . . | . . . |
| | | 992 | 3E0000 | 3E0FFF |
| | . . . | . . . | . . . | . . . |
| | | . . . | . . . | . . . |
| | | . . . | . . . | . . . |
| | 1 | 31 | 01F000 | 01FFFF |
| | | . . . | . . . | . . . |
| | | 16 | 010000 | 010FFF |
| | 0 | 15 | 0OF000 | 00FFFF |
| | | . . . | . . . | . . . |
| | | 0 | 000000 | 000FFF |

In the table 5, the address range represents an address range; Device represents a drive block; the Block represents block, and Sector represents a sector.

TABLE 6

| Mode | Number of gamma voltage data groups | Description | Drive block/Block | Sector | Start Address | End Address |
|---|---|---|---|---|---|---|
| IRC ON | 1 | 120 Hz with IRC on | 0/5 | 90 | 05A000 | 05A800 |
| | 2 | 60 Hz With IRC on | | 89 | 059801 | 059FFF |
| | 3 | 60 Hz With IRC on | | 89 | 059000 | 059800 |
| | 4 | 120 Hz/120 Hz_b with IRC on | | 88 | 058801 | 058FFF |
| | 5 | 60 Hz/60 Hz_b with IRC on | | 88 | 058000 | 058800 |
| IRC OFF | 6 | 120 Hz With IRC off | | 87 | 057000 | 057800 |
| | 7 | 60 Hz With IRC off | | 86 | 056801 | 056FFF |
| | 8 | 60 Hz With IRC off | | 86 | 056000 | 056800 |
| | 9 | 120 Hz/120 Hz_b with IRC off | | 85 | 055801 | 055FFF |
| | 10 | 60 Hz/60 Hz_b with IRC off | | 85 | 055000 | 055800 |

In the table 6, IRC on represents an IRC on mode; IRC OFF represents an IRC off mode; 120 Hz with IRC on means that a display refresh frequency is 120 Hz and an IRC on state is enabled; 120 Hz with IRC off means that a display refresh frequency is 120 Hz and an IRC off state is enabled;

60 Hz with IRC on means that a display refresh frequency is 60 Hz and an IRC on state is enabled; 60 Hz with IRC off means that a display refresh frequency is 60 Hz and an IRC off state is enabled; 120 Hz/120 Hz_b with IRC on means that a base frequency is 120 Hz, a display refresh frequency is 120 Hz and an IRC on state is enabled; 120 Hz/120 Hz_b with IRC off means that a base frequency is 120 Hz, a display refresh frequency is 120 Hz, and an IRC off state is enabled; 60 Hz/60 Hz_b with IRC on means that a base frequency is 60 Hz, a display refresh frequency is 60 Hz, and an IRC on state is enabled; 60 Hz/60 Hz_b with IRC off means that a base frequency is 60 Hz, a display refresh frequency is 60 Hz, and an IRC off state is enabled.

TABLE 7

| Device | Block | sector | address range | |
|---|---|---|---|---|
| 0 | 63 | 1023 | 3FF000 | 3FFFFF |
| | | . . . | . . . | . . . |
| | | 1008 | 3F0000 | 3F0FFF |
| | . . . | . . . | . . . | . . . |
| | | . . . | . . . | . . . |
| | | . . . | . . . | . . . |
| | 5 | 95 | 05F000 | 05FFFF |
| | | . . . | . . . | . . . |
| | | 90 | 05A000 | 05AFFF |
| | | 89 | 059000 | 059FFF |
| | | 88 | 058000 | 058FFF |
| | | 87 | 057000 | 057FFF |
| | | 86 | 056000 | 056FFF |
| | | 85 | 055000 | 055FFF |
| | | . . . | . . . | . . . |
| | | 80 | 050000 | 050FFF |
| | . . . | . . . | . . . | . . . |
| | | . . . | . . . | . . . |
| | | . . . | . . . | . . . |
| | 0 | 15 | 00F000 | 00FFFF |
| | | . . . | . . . | . . . |
| | | 0 | 000000 | 000FFF |

In the table 7, the address range represents an address range.

Optionally, the switching of the application scenarios includes: changing a base frequency of the display device, and/or, changing a display refresh frequency of the display device.

Optionally, the switching of the application scenarios includes: switching between an IRC on of the display device and an IRC off of the display device.

Optionally, the switching of the application scenarios includes: switching between a fingerprint recognition mode of the display device and a non-fingerprint recognition mode of the display device.

In at least one embodiment of the present disclosure, switching of the application scenarios is not limited to the above several switching modes.

The gamma voltage data group switching method in the embodiments of the present disclosure is applied to a display device. The display device includes a display-driver integrated circuit and a first storage unit. The display-driver integrated circuit includes a second storage unit. As shown in FIG. 1, the gamma voltage data group switching method includes:

- step S1: pre-storing, in the first storage unit, multiple groups of gamma voltage data groups respectively applied to various application scenarios;
- step S2: after switching of an application scenario of the display device, loading a gamma voltage data group corresponding to the current application scenario and stored in the first storage unit into the second storage unit.

In the embodiments of the present disclosure, after switching the application scenario of the display device to the current application scenario, the gamma voltage data group corresponding to the current application scenario is determined, and the gamma voltage data group is selected from multiple groups of gamma voltage data groups stored in the first storage unit. The multiple groups of gamma voltage data groups are corresponding to the various application scenarios of the display device in a one-to-one manner.

In the gamma voltage data group switching method of the embodiments of the present disclosure, the gamma voltage data groups applied to various application scenarios can be pre-stored in the first storage unit; and after switching the application scenario of the display device, the gamma voltage data group corresponding to the current application scenario and stored in the first storage unit, is loaded into the second storage unit, thereby realizing unlimited writing and reworking of the gamma voltage data groups and then improving the yield rate of production lines. Further, in the embodiments of the present disclosure, more groups of gamma voltage data groups can be stored, which can meet requirements for gamma voltage data groups in more application scenarios and enable smooth switching of gamma voltage data groups.

In at least one embodiment of the present disclosure, the first storage unit may be a flash memory, and the second storage unit may be a random access memory (RAM). The second storage unit may be included in a driver integrated circuit (DIC). The DIC may be a display-driver integrated circuit.

In at least one embodiment of the present disclosure, the display device further includes a display panel. After the step of after switching the application scenario of the display device, loading the gamma voltage data group corresponding to the current application scenario stored in the first storage unit into the second storage unit, the gamma voltage data group switching method further includes:

- calling, by the display-driver integrated circuit, the gamma voltage data group corresponding to the current application scenario from the second storage unit and controlling the display panel to display according to the called gamma voltage data group.

In specific implementation, when the application scenario is switched, after the gamma voltage data group corresponding to the current application scenario is loaded from the first storage unit into the second storage unit, the display-driver integrated circuit calls the gamma voltage data group corresponding to the current application scenario from the second storage unit, and controls the display panel to display according to the called gamma voltage data group.

Figure 2:
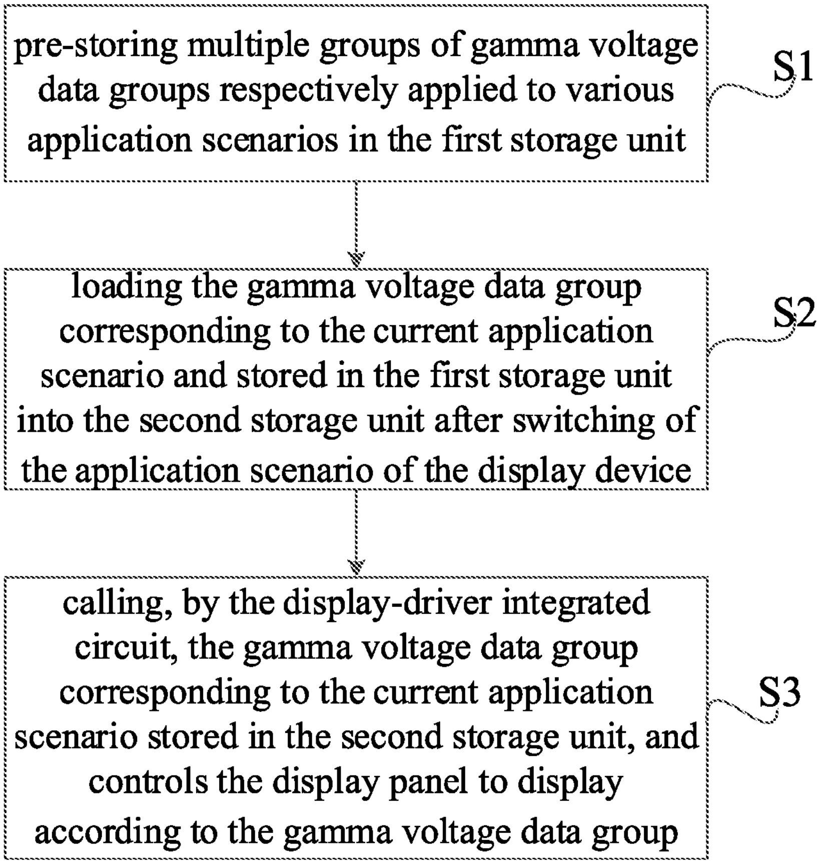
FIG. 2 is a flowchart of a gamma voltage data group switching method according to at least one embodiment of the present disclosure.

As shown in FIG. 2, after the step S2, the Gamma voltage data group switching method further includes:

- step S3: calling, by the display-driver integrated circuit, the gamma voltage data group corresponding to the current application scenario from the second storage unit and controlling the display panel to display according to the called gamma voltage data group.

In at least one embodiment of the present disclosure, when switching the application scenario, in a first display cycle, the gamma voltage data group corresponding to the current application scenario stored in the first storage unit is loaded into the second storage unit; and in a second display cycle, the display-driver integrated circuit calls the gamma voltage data group corresponding to the current application scenario from the second storage unit.

The gamma voltage data group switching method further includes:

controlling, by the display-driver integrated circuit, the display panel for performing black frame insertion displaying in the first display cycle and the second display cycle; or, controlling, by the display-driver integrated circuit, the display panel for performing black frame insertion displaying in the first display cycle.

In specific implementation, after switching the application scenario, in the first display cycle, the gamma voltage data group corresponding to the current application scenario is loaded into the second storage unit; in the second display cycle, the display-driver integrated circuit calls the gamma voltage data group corresponding to the current application scenario from the second storage unit. In the first display cycle and the second display cycle, the display-driver integrated circuit controls the display panel for performing black frame insertion displaying, i.e., controlling the display panel to display a black image; or, in the first display cycle, the display-driver integrated circuit controls the display panel for performing black frame insertion displaying, so that no flicker phenomenon occurs during switching of the gamma voltage data groups.

In at least one embodiment of the present disclosure, a storage capacity of the first storage unit is greater than a storage capacity of the second storage unit.

In specific implementation, the first storage unit may be a flash, and the second storage unit may be RAM. The storage capacity of the flash may be, for example, 32 M. In general, a space occupied by the gamma voltage data group may be about 2K, then the flash can store 16000 groups of the gamma voltage data groups, which are not limited to this.

Optionally, the switching of the application scenarios includes: changing a base frequency of the display device, and/or, changing a display refresh frequency of the display device.

Optionally, the switching of the application scenarios includes: switching between an IRC on of the display device and an IRC off of the display device.

Optionally, the switching of the application scenarios includes: switching between a fingerprint recognition mode of the display device and a non-fingerprint recognition mode of the display device.

In at least one embodiment of the present disclosure, switching of the application scenarios is not limited to the above several switching modes.

Figure 3:
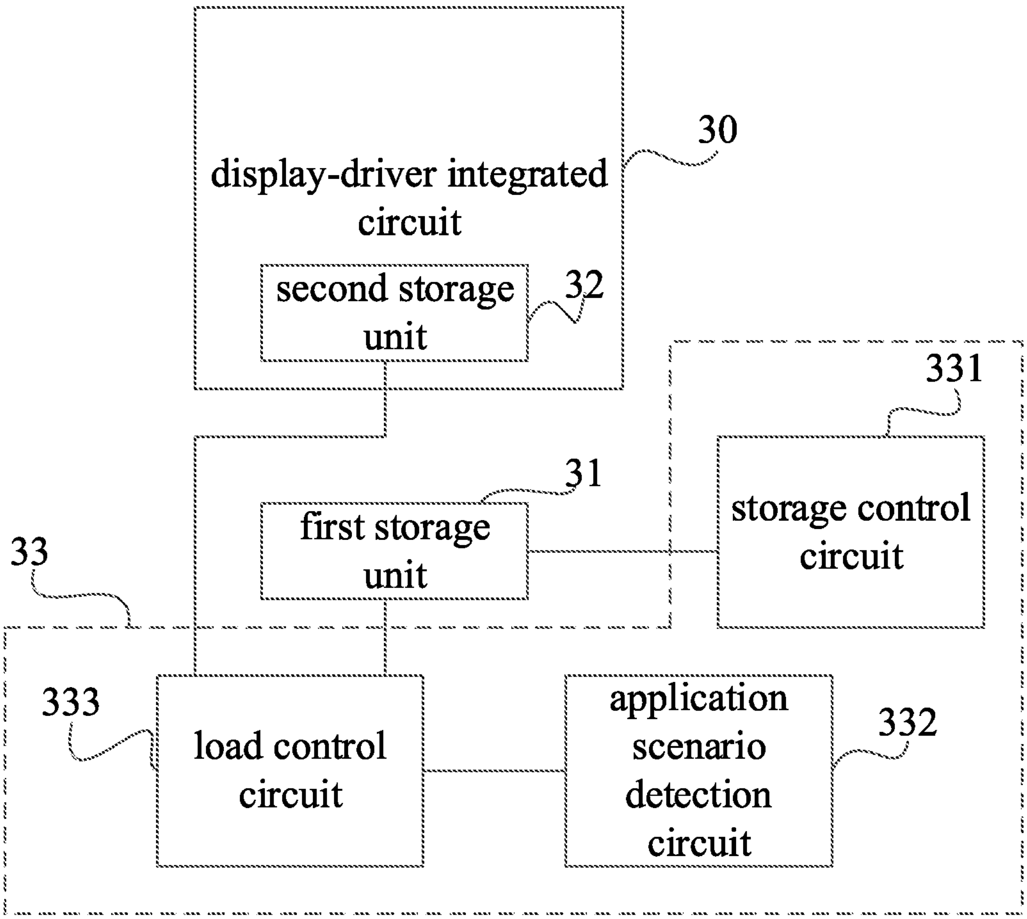
FIG. 3 is a schematic diagram of a gamma voltage data group switching module according to at least one embodiment of the present disclosure.

The gamma voltage data group switching module of the embodiments of the present disclosure is applied to a display device. As shown in FIG. 3, the display device includes a display-driver integrated circuit 30 and a first storage unit 31. The display-driver integrated circuit 30 includes a second storage unit 32. The gamma voltage data group switching module 33 includes a storage control circuit 331, an application scenario detection circuit 332 and a loading control circuit 333.

The storage control circuit 331 is electrically connected to the first storage unit 31, and is used to control storing multiple groups of gamma voltage data groups respectively applied to various application scenarios in the first storage unit 31.

The application scenario detection circuit 332 is electrically connected to the loading control circuit 333, and is used to detect whether the application scenario of the display device is switched, and provides a first-control signal to the loading control circuit 333 when the application scenario is switched.

The loading control circuit 333 is electrically connected to the first storage unit 31 and the second storage unit 32 respectively, and is used to load the gamma voltage data group corresponding to the current application scenario stored in the first storage unit 31 into the second storage unit 32 after receiving the first-control signal.

In at least one embodiment of the present disclosure, the application scenario detection circuit 332 is specifically used to detect whether a base frequency of the display device, and/or, a display refresh frequency of the display device is changed, and when detecting a change in the base frequency and/or the display refresh frequency, provide a first first-control signal to the loading control circuit 333.

The loading control circuit 333 is used to, after receiving the first first-control signal, load the gamma voltage data group corresponding to the current base frequency and the current display refresh frequency and stored in the first storage unit 31, into the second storage unit 32.

In at least one embodiment of the present disclosure, the application scenario detection circuit 332 is specifically used to detect whether an IRC function of the display device is switched between an on state and an off state, and when detecting that the IRC function of the display device is switched between the on state and the off state, provide a second first-control signal to the loading control circuit 333.

The loading control circuit 333 is used to, after receiving the second first-control signal, load the gamma voltage data group corresponding to the current state of the IRC function stored in the first storage unit 31 into the second storage unit 32.

In at least one embodiment of the present disclosure, the application scenario detection circuit 332 is specifically used to detect whether the display device is switched between a fingerprint recognition mode and a non-fingerprint recognition mode, and when detecting that the display device is switched between the fingerprint recognition mode and the non-fingerprint recognition mode, provide a third first-control signal to the loading control circuit 333.

The loading control circuit 333 is used to, after receiving the third first-control signal, load the gamma voltage data group corresponding to the current fingerprint identification mode or non-fingerprint identification mode of the display device stored in the first storage unit 31 into the second storage unit 32.

The display device in at least one embodiment of the present disclosure further includes a display-driver integrated circuit and a first storage unit. The display-driver integrated circuit includes a second storage unit.

The first storage unit is electrically connected to the storage control circuit, and is used to receive the multiple groups of the gamma voltage data groups respectively applied to various application scenarios.

The second storage unit is electrically connected to the loading control circuit, and is used to receive the gamma voltage data group corresponding to the current application scenario.

Figure 4:
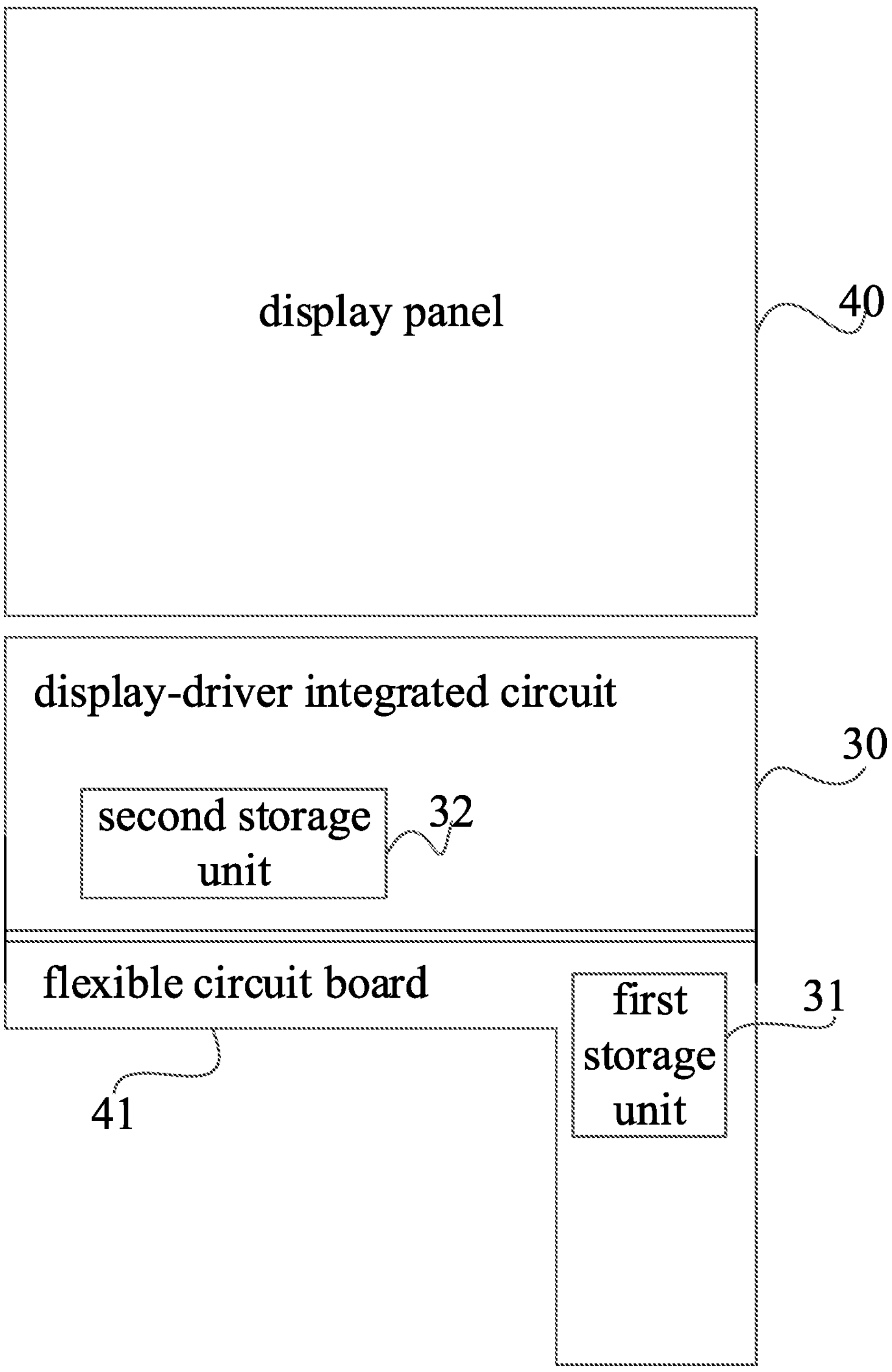
FIG. 4 is a schematic diagram of a display device according to at least one embodiment of the present disclosure.

As shown in FIG. 4, a display device in at least one embodiment of the present disclosure includes a gamma voltage data group switching module, a display-driver integrated circuit 30 and a first storage unit 31. The display-driver integrated circuit 30 includes a second storage unit 32.

The first storage unit 31 is electrically connected to a storage control circuit included in the gamma voltage data group switching module, and is used to receive multiple groups of gamma voltage data groups respectively applied to various application scenarios.

The second storage unit 32 is electrically connected to a loading control circuit included in the gamma voltage data group switching module, and is used to receive the gamma voltage data group corresponding to the current application scenario.

In at least one embodiment of the display device shown in FIG. 4, the first storage unit 31 may be included in a flexible circuit board 41.

As shown in FIG. 4, the display device in at least one embodiment of the present disclosure further includes a display panel 40. The display-driver integrated circuit 30 is further used to call the gamma voltage data group corresponding to the current application scenario from the second storage unit 32, and control the display panel 40 to display according to the called gamma voltage data group.

The loading control circuit is used to, after receiving the first-control signal, load the gamma voltage data group corresponding to the current application scenario stored in the first storage unit 31 into the second storage unit 32.

In at least one embodiment of the present disclosure, the switching of the application scenarios of the display device includes: changing a base frequency of the display device, changing a display refresh frequency of the display device (for example, the display refresh frequency of the display device is switched between 120 Hz and 60 Hz), switching between an IRC on of the display device and an IRC off of the display device, switching between a fingerprint recognition mode of the display device and a non-fingerprint recognition mode of the display device, etc. Each combination of situations requires one group of gamma voltage data group, and thus the required number of groups of gamma voltage data groups exceeds the number of groups of gamma voltage data groups that can be accommodated in the second storage unit 32 in the display-driver integrated circuit 30. In view of this, in at least one embodiment of the present disclosure, gamma voltage data groups corresponding to all application scenarios are stored in the first storage unit 31. When the display panel included in the display device is turned on, in the IRC on mode, the display-driver integrated circuit 30 loads five groups of gamma voltage data groups at Device0/Block 5/Sector 88-90 in the first storage unit 31 into the second storage unit 32 through serial peripheral interface (SPI) communication. The display-driver integrated circuit 30 can control switching of the gamma voltage data group corresponding to the current application scenario among the five groups of gamma voltage data groups through a command prompt (CMD).

Optionally, the loading control circuit included in the gamma voltage data group switching module is used to load the gamma voltage data group corresponding to the current application scenario stored in the first storage unit into the second storage unit in a first display cycle. The display-driver integrated circuit is used to call the gamma voltage data group corresponding to the current application scenario from the second storage unit in a second display cycle.

The display-driver integrated circuit is further used to control the display panel for performing black frame insertion displaying in the first display cycle and the second display cycle, or, the display-driver integrated circuit is further used to control the display panel for performing black frame insertion displaying in the first display cycle.

In specific implementation, after switching the application scenario of the display device, in the first display cycle, the loading control circuit loads the gamma voltage data group corresponding to the current application scenario stored in the first storage unit into the second storage unit in the first display cycle; the display-driver integrated circuit calls the gamma voltage data group corresponding to the current application scenario from the second storage unit in the second display cycle. The display-driver integrated circuit controls the display panel for performing black frame insertion displaying in the first display cycle and the second display cycle, or, in the first display cycle, the display-driver integrated circuit controls the display panel for performing black frame insertion displaying, thereby eliminating flickering phenomenon when switching application scenarios.

In at least one embodiment of the present disclosure, a storage capacity of the first storage unit is greater than a storage capacity of the second storage unit.

Optionally, the first storage unit may be a flash, and the second storage unit may be RAM.

In specific implementation, when the display device needs to enter the HDR mode, the IRC IP (functional unit) needs to be turned off; and at this point, the gamma voltage data group in the IRC OFF mode needs to be called. While the gamma voltage data group in the IRC OFF mode is stored in the flash, the display-driver integrated circuit 30 needs to load the gamma voltage data group corresponding to the IRC OFF mode in the flash into the RAM in the display-driver integrated circuit 30. When the display device is switched from the IRC on mode to the IRC OFF mode, in the first frame time, the IRC IP is turned off, and the gamma voltage data group corresponding to the IRC OFF mode is loaded into the RAM in the display-driver integrated circuit 30; in the second frame time, the display-driver integrated circuit 30 calls the gamma voltage data group corresponding to the current application scenario from the RAM. The display-driver integrated circuit 30 controls the display panel for performing black frame insertion displaying in the first frame time and the second frame time, or, the display-driver integrated circuit 30 controls the display panel for performing black frame insertion displaying in the first frame time, so that no flicker phenomenon occurs.

Figure 5:
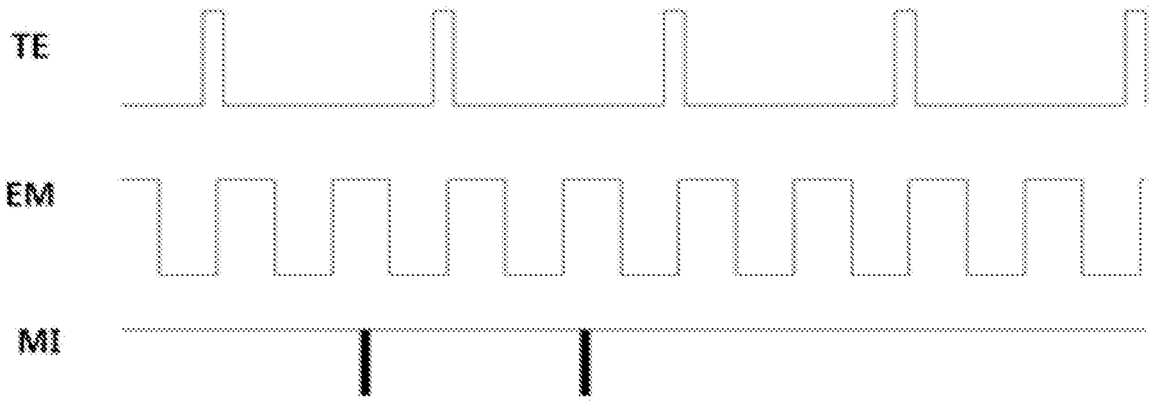
FIG. 5 is a schematic diagram showing operation timing of a display device according to at least one embodiment of the present disclosure.

In FIG. 5, TE represents a frame start signal; EM represents a light-emitting control signal; and MI represents an instruction indication signal.

As shown in FIG. 5, at a falling edge of TE, a frame time begins, and a pulse of MI indicates a corresponding instruction write.

In at least one embodiment shown in FIG. 5, a first downward pulse of MI is corresponding to an instruction of writing an IRC off CMD and an instruction of triggering to load the gamma voltage data group corresponding to the IRC off state to the RAM. A second downward pulse of MI is corresponding to an instruction of calling, by DIC, the gamma voltage data group corresponding to the IRC off state from RAM. An instruction corresponding to a falling edge of MI starts to be implemented after starting of an adjacent next frame time.

Figure 6:
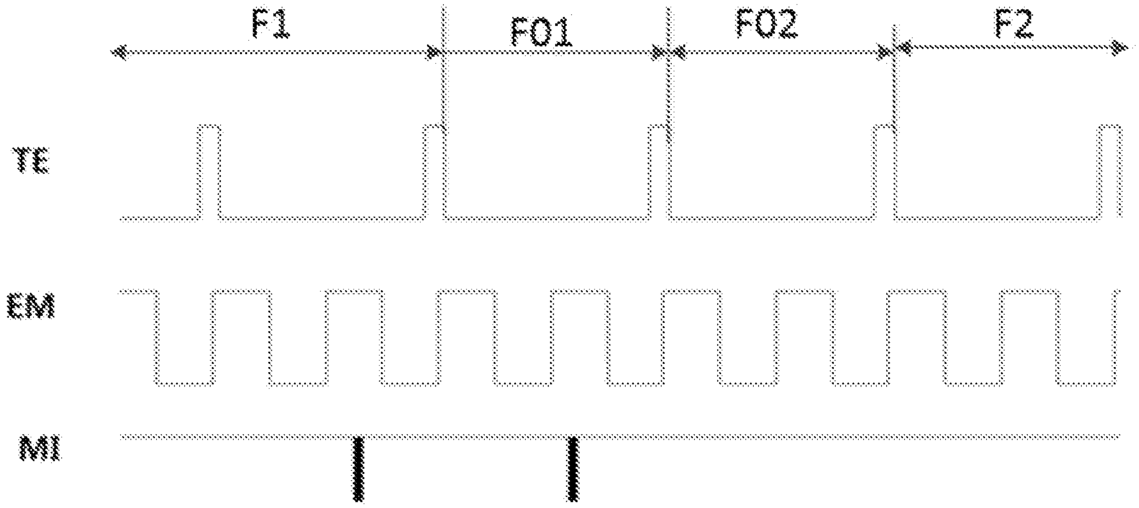
FIG. 6 is a schematic diagram showing operation timing of a display device according to at least one embodiment of the present disclosure.

As shown in FIG. 6, when switching of the application scenario of the display device from an IRC on state to an IRC off state,

- in a period F1 before a second falling edge of TE, the display device is in the IRC on state;
- during a period between a first falling edge of TE and the second falling edge of TE, MI has a first downward pulse, where the first downward pulse of MI is corresponding to an instruction of writing an IRC off CMD and an instruction of triggering to load the gamma voltage data group corresponding to the IRC off state to the RAM; after the second falling edge of TE, the gamma voltage data group corresponding to the IRC off state is loaded into RAM; in a period F01 between the second falling edge of TE and a third falling edge of TE, DIC still uses the gamma voltage data group corresponding to the IRC on state, but the gamma voltage data group corresponding to the IRC off state has been loaded into RAM;

during a period F01 between the second falling edge of TE and the third falling edge of TE, MI has a second downward pulse, where the second downward pulse of MI is corresponding to an instruction of calling, by DIC, the gamma voltage data group corresponding to the IRC off state from RAM; after the third falling edge of TE, the DIC calls the gamma voltage data group corresponding to the IRC off state from the RAM, and the application scenario of the display device is switched to the IRC off state;

during a period F2 after a fourth falling edge of TE, the display device is in the IRC off state. In FIG. 6, a period between the third falling edge of TE and the fourth falling edge of TE is F02.

In specific implementation, in F01 and F02, the display panel can perform black frame insertion displaying, thereby eliminating the flicker phenomenon during switching of the application scenarios; or, in F01, the display panel can perform black frame insertion displaying, thereby eliminating the flicker phenomenon during switching of the application scenarios.

The display device provided in the embodiments of the present disclosure may be any product or component with display functions, such as a mobile phone, a tablet computer, a television, a monitor, a notebook computer, a digital photo frame, a navigator.

The above are merely the optional embodiments of the present disclosure. It should be noted that, a person skilled in the art may make improvements and modifications without departing from the principle of the present disclosure, and these improvements and modifications shall also fall within the scope of the present disclosure.

What is claimed is:

1. A display device, comprising: a display-driver integrated circuit and a first storage unit; wherein the display-driver integrated circuit comprises a second storage unit, and the display device comprises a gamma voltage data group switching module;

the gamma voltage data group switching module is configured to pre-store, in the first storage unit, multiple groups of gamma voltage data groups respectively applied to various application scenarios; when switching of an application scenario of the display device, load a gamma voltage data group corresponding to the current application scenario and stored in the first storage unit into the second storage unit;

wherein the switching of the application scenario comprises: switching between an IRC on of the display device and an IRC off of the display device; or wherein the switching of the application scenario comprises: switching between a fingerprint recognition mode of the display device and a non-fingerprint recognition mode of the display device.

2. The display device according to claim 1, wherein the display device further comprises a display panel;

the gamma voltage data group switching module is configured to, when switching of the application scenario of the display device, after loading the gamma voltage data group corresponding to the current application scenario and stored in the first storage unit into the second storage unit, control the display-driver integrated circuit to call the gamma voltage data group corresponding to the current application scenario from the second storage unit and control the display panel to display according to the called gamma voltage data group.

3. The display device according to claim 2, wherein the gamma voltage data group switching module is configured to, when switching of the application scenario of the display device, in a first display cycle, load the gamma voltage data group corresponding to the current application scenario and stored in the first storage unit into the second storage unit; and in a second display cycle, control the display-driver integrated circuit to call the gamma voltage data group corresponding to the current application scenario from the second storage unit;

the gamma voltage data group switching module is further configured to control the display-driver integrated circuit to control the display panel for performing black frame insertion displaying in the first display cycle and the second display cycle; or, control the display-driver integrated circuit to control the display panel for performing black frame insertion displaying in the first display cycle.

4. The display device according to claim 1, wherein a storage capacity of the first storage unit is greater than a storage capacity of the second storage unit.

5. The display device according to claim 1, wherein the switching of the application scenario comprises: changing a base frequency of the display device, and/or, changing a display refresh frequency of the display device.

6. A gamma voltage data group switching method applied to a display device which comprises a first storage unit and a display-driver integrated circuit comprising a second storage unit, the gamma voltage data group switching method comprising:

pre-storing, in the first storage unit, multiple groups of gamma voltage data groups respectively applied to various application scenarios;

after switching of an application scenario of the display device, loading a gamma voltage data group corresponding to the current application scenario and stored in the first storage unit into the second storage unit;

wherein the switching of the application scenario comprises: switching between an IRC on of the display device and an IRC off of the display device; or wherein the switching of the application scenario comprises: switching between a fingerprint recognition mode of the display device and a non-fingerprint recognition mode of the display device.

7. The method according to claim 6, wherein the display device further comprises a display panel; after the step of after switching of the application scenario of the display device, loading the gamma voltage data group corresponding to the current application scenario and stored in the first storage unit into the second storage unit, the gamma voltage data group switching method further comprises:

calling, by the display-driver integrated circuit, the gamma voltage data group corresponding to the current application scenario from the second storage unit and controlling the display panel to display according to the called gamma voltage data group.

8. The method according to claim 7, wherein after switching of the application scenario, in a first display cycle, the gamma voltage data group corresponding to the current application scenario and stored in the first storage unit is loaded into the second storage unit; and in a second display cycle, the display-driver integrated circuit calls the gamma voltage data group corresponding to the current application scenario from the second storage unit;

the gamma voltage data group switching method further comprises:

controlling, by the display-driver integrated circuit, the display panel for performing black frame insertion displaying in the first display cycle and the second display cycle; or, controlling, by the display-driver integrated circuit, the display panel for performing black frame insertion displaying in the first display cycle.

9. The method according to claim 8, wherein the first display cycle is a first frame time, and the second display cycle is a second frame time;

the gamma voltage data group switching method comprises:

in case that there is a pulse in an instruction indication signal in a frame time before the first frame time, wherein the pulse is corresponding to an instruction for triggering loading of a gamma voltage data group corresponding to a switched application scenario to the second storage unit, in the first frame time, loading the gamma voltage data group corresponding to the switched application scenario and stored in the first storage unit into the second storage unit;

in case that there is a pulse in an instruction indication signal in the first frame time, wherein the pulse is corresponding to an instruction of calling, by the display-driver integrated circuit, the gamma voltage data group corresponding to the switched application scenario from the second storage unit, in the second frame time, calling, by the display-driver integrated circuit, the gamma voltage data group corresponding to the switched application scenario from the second storage unit.

10. The method according to claim 6, wherein a storage capacity of the first storage unit is greater than a storage capacity of the second storage unit.

11. The method according to claim 6, wherein the switching of the application scenario comprises: changing a base frequency of the display device, and/or, changing a display refresh frequency of the display device.

12. A gamma voltage data group switching module applied to a display device which comprises a first storage unit and a display-driver integrated circuit comprising a second storage unit; the gamma voltage data group switching module comprising a storage control circuit, an application scenario detection circuit and a loading control circuit;

wherein the storage control circuit is configured to control storing multiple groups of gamma voltage data groups respectively applied to various application scenarios in the first storage unit;

the application scenario detection circuit is configured to detect whether an application scenario of the display device is switched, and provides a first-control signal to the loading control circuit when the application scenario is switched;

the loading control circuit is configured to, after receiving the first-control signal, load a gamma voltage data group corresponding to the current application scenario and stored in the first storage unit into the second storage unit;

wherein the application scenario detection circuit is specifically configured to detect whether an IRC of the display device is switched between an on state and an off state, and when detecting that the IRC of the display device is switched between the on state and the off state, provide a second first-control signal to the loading control circuit;

the loading control circuit is configured to, after receiving the second first-control signal, load a gamma voltage data group corresponding to a current state of the IRC and stored in the first storage unit into the second storage unit; or wherein the application scenario detection circuit is specifically configured to detect whether the display device is switched between a fingerprint recognition mode and a non-fingerprint recognition mode, and when detecting that the display device is switched between the fingerprint recognition mode and the non-fingerprint recognition mode, provide a third first-control signal to the loading control circuit;

the loading control circuit is configured to, after receiving the third first-control signal, load a gamma voltage data group corresponding to a current fingerprint identification mode or non-fingerprint identification mode of the display device and stored in the first storage unit into the second storage unit.

* * * * *